Patented July 29, 1924.

1,503,175

UNITED STATES PATENT OFFICE.

HERBERT A. WALKER, OF FULLERTON, CALIFORNIA, ASSIGNOR TO FREDERICK W. SMITH, OF WHITTIER, CALIFORNIA.

BRAKE DRUM OR THE LIKE.

Application filed September 8, 1922. Serial No. 586,854.

*To all whom it may concern:*

Be it known that I, HERBERT A. WALKER, a citizen of the United States, residing at Fullerton, in the county of Orange and State of California, have invented new and useful Improvements in Brake Drums or the like, of which the following is a specification.

This invention relates to brake drums and particularly to brake drums for vehicle wheels. It is an object of the present invention to provide a brake drum apparatus that may be readily combined with the usual or standard hub and disc elements of various forms of automobile wheels that have been constructed, that are in use, and that may be constructed. In other words, it is an object of the invention to provide a brake mechanism that can be readily applied to the present standard equipment of various types of automobile wheels. It is another object to provide a brake attachment of extreme simplicity and low cost of production and permitting low selling price. Another object is to provide a brake device having a large braking area to which there may be applied a contractive braking band.

Other objects and advantages will be made manifest in the following specification of embodiments of the invention illustrated in the accompanying drawings, wherein—

A broad object of my invention is to provide a construction in the form of a brake drum that may be readily assembled with and attached to the usual brake flange and hub of various types of carriers but with little or no change of the hub and its flange.

Figure 1:
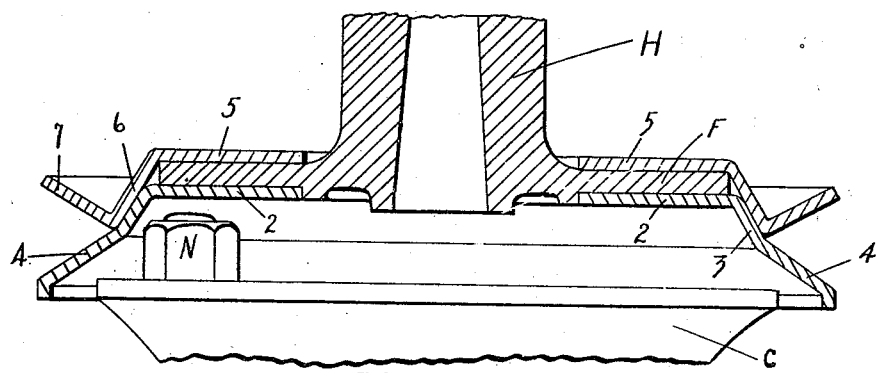
Figure 1 is a sectional view axially of a hub showing the applied brake drum in one form.

In Fig. 1 a hub H is shown as provided with a transversely extending brake drum receiving flange F. This flange is disposed adjacent to a housing or casing portion C having fastening nuts N which sweep close to the adjacent flange F. In this modification of the invention I provide a brake drum consisting of an inner flange 2 having an outturned or angular portion 3 disposed so that it will sweep clear of the fastening nuts N, and beyond this angular portion 3 there is provided a braking rim 4. The brake drum flange 2 is placed on the inside of the hub flange F, and on the outside of the latter there is an outside disc or flange 5 having an inwardly deflected annular portion 6 overlapping and being secured in any manner on the contiguous drum portion 3 of the inner disc 2. The annular portion 6 terminates at the angle between the portion 3 and the braking rim 4 and is provided with a braking rim 7 diverging from the braking rim 4 and preferably being of equal angle in the opposite direction from a line perpendicular to the axis of the hub.

The brake drum, therefore, consists of braking rims 4 and 7 diverging and forming a V-shaped peripheral channel to receive any suitable contractive braking shoe or member.

The brake discs 2 and 5 may be attached by bolts fastened through the usual bolt holes in the hub flange F.

Figure 2:
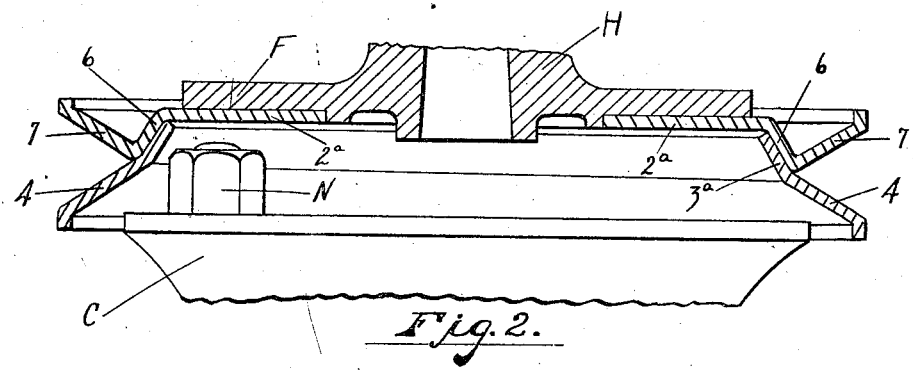
Fig. 2 is an axial section of a modified form of the brake drum.

A slightly modified form of the invention is shown in Fig. 2 wherein there is but one disc as 2ª which is designed to be fastened to the inside of the flange F of the hub. This brake disc 2ª is provided with the inturned portion 6 and with the outturned braking rim 7 corresponding to that of Fig. 1. Securely attached to the disc shoulder 6 is an inside flange 3ª beyond which projects the complementary braking rim 4. By this construction it will be seen that I utilize but one disc or flange part 2ª to be secured to the hub flange F.

Figure 3:
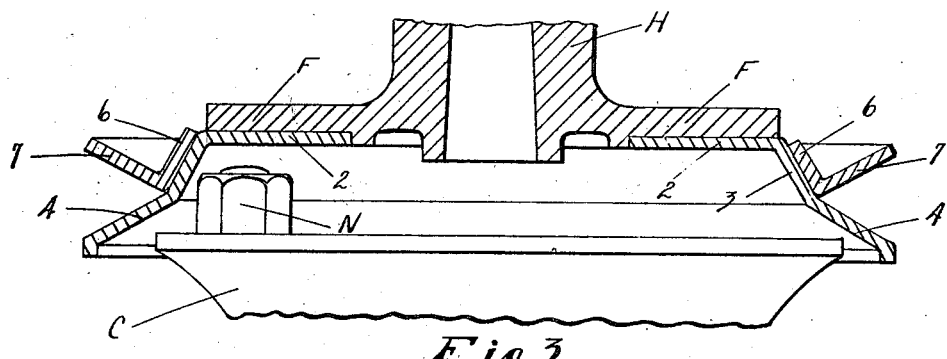
Fig. 3 is an axial section of a further modified form of the drum.

A variant of the single brake drum disc is shown in Fig. 3 in which the inside disc 2 is mounted on the flange F and has the intermediate shoulder 3 beyond which extends the inside braking rim 4. The complementary outside brake rim 7 is provided with a short outturned shoulder 6 bearing on the shoulder 3, these shoulders being secured in overlapping rigid position so as to form between the braking rims 4 and 7 the desired angular or V-shaped groove to receive the contracting braking shoe which is not shown.

From the above it will be seen that I have provided an extremely simple, substantial and effective brake drum device providing a relatively large braking area on the angular faces between the braking rims, and have further provided a construction which may be readily attached through the usual flanges of wheel hubs.

Further embodiments, modifications and changes may be resorted to within the spirit of the invention as here claimed.

What is claimed is:

1. A braking drum device adapted for attachment to given types of standard wheel hubs having flanges, comprising a pair of rigidly united divergent braking rims forming a substantially V-shaped brake shoe groove, and means extending inwardly from said rims whereby the device may be securely attached to the said hub flange.

2. A braking drum device adapted for attachment to given types of standard wheel hubs having flanges, comprising a pair of rigidly united divergent braking rims forming a substantially V-shaped brake shoe groove, and means extending inwardly from said rims whereby the device may be securely attached to the said hub flange, said means including a disc adapted to be secured flatwise to a contiguous face of the hub flange.

3. A braking drum device adapted for attachment to given types of standard wheel hubs having flanges, comprising a pair of rigidly united divergent braking rims forming a substantially V-shaped brake shoe groove, and means extending inwardly from said rims whereby the device may be securely attached to the said hub flange, said means including inside and outside spaced discs to be applied on opposite sides of the hub flange.

4. A braking drum device adapted for attachment to given types of standard wheel hubs having flanges, comprising a pair of rigidly connected outwardly divergent braking rims to receive a contracted brake shoe, said rims having laterally deflected inner shoulders adapted to be lapped upon each other and rigidly secured, one of said shoulders having a disc or body portion adapted to be fastened to the flange of the hub.

5. A braking drum device adapted for attachment to given types of standard wheel hubs having flanges, comprising a pair of rigidly united divergent braking rims forming a substantially V-shaped brake shoe groove, and means extending inwardly from said rims whereby the device may be securely attached to the said hub flange, the rims having laterally deflected overlapping shoulder portions, the inner one of which is adapted to clear contiguous fastening nuts of a machine when mounted thereon.

In testimony whereof I have signed my name to this specification.

HERBERT A. WALKER.